(No Model.)
M. S. SMALL.
FISH SACK.
No. 268,558. Patented Dec. 5, 1882.
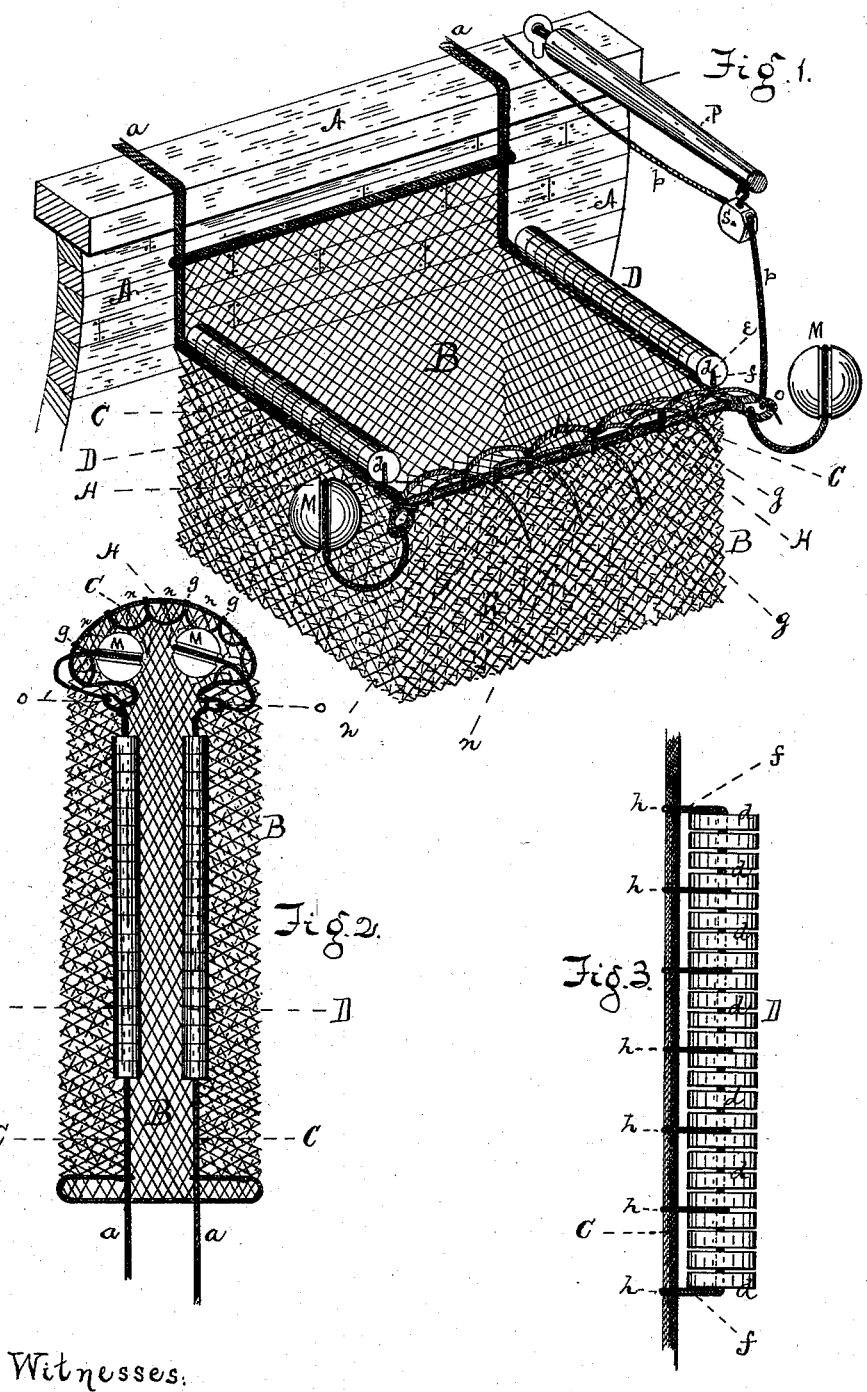
Witnesses:
Wm. H. Motley
J. C. Kendall
Inventor:
M. S. Small
By his att'y
Herbert G. Buggs

UNITED STATES PATENT OFFICE.

MICHAEL S. SMALL, OF CAPE ELIZABETH, MAINE.

FISH-SACK.

SPECIFICATION forming part of Letters Patent No. 268,558, dated December 5, 1882.

Application filed June 9, 1882. (No model.)

*To all whom it may concern:*

Be it known that I, MICHAEL SAUNDERS SMALL, residing in Cape Elizabeth, in the county of Cumberland and State of Maine, have invented certain new and useful Improvements in Fish Sacks or Pockets; and I do hereby declare that the following is a full, clear, and exact description of the invention, which will enable others skilled in the art to which it appertains to make and use the same.

The nature of this invention has relation to new and useful improvements in the construction of that particular class of fishing apparatus usually designated as a "side floating fish sack or pocket"—a device now in quite general use in certain branches of the fishing industry for the purpose of furnishing a convenient receptacle for securely retaining alongside the fishing-vessel the fish which have previously been caught in large seines. The use of said side floating sacks or pockets obtains to a very great extent among the seiners of such fish as swim in schools near the surface of the water—for example, such as mackerel.

In conducting the business of mackerel fishing the practice is to first catch the fish in large seines operated in the ordinary way. The fish are then transferred to the smaller sack or pocket attached to and floating alongside the vessel. In this sack the fish can be easily kept in a live state for a considerable length of time, and can be readily bailed out of the same when desired for dressing and packing.

The objects which I seek to obtain by this invention are several—viz., the production of a side floating fish sack or pocket for fishing-vessels which shall be more simple in construction and more readily operated than any device for like purpose now in common use, which can be readily taken from the water and folded or rolled into a compact mass to be conveniently carried about when not in use, and which will be comparatively inexpensive in cost.

To this end the nature of my invention consists in certain skillful arrangements and combinations of parts, to be hereinafter explicitly described and claimed.

In the accompanying drawings, which illustrate my improved floating fish sack or pocket, Figure 1 shows in perspective the device attached to the side of a vessel. Fig. 2 represents the sack or pocket rolled up on the vessel's deck. Fig. 3 is a detail of the series of contiguous buoys or floats, showing the method of fastening the same to the hanging-line.

Similar letters of reference indicate corresponding parts.

Specific description of the several mechanical parts embodied in my invention will first be made with direct reference to Fig. 1 of the drawings, in which the letter A represents the side of a fishing-vessel. Suspended over the side of A by means of ropes *a a* is seen a box-shaped fish sack or pocket, B. This sack is made of heavy twine netted or woven together after the ordinary method of making seines or nets.

C is a hanging-line. This line runs around the mouth or upper edges of the sack. To it is hung the netted sack B.

Located above the hanging-line, on two sides of the sack or pocket, are seen cylindrical bodies D D. The parts D D, while having in the drawings the general appearance of being heavy and rigid bodies, are in fact very light and quite flexible. They are composed of a great number of small buoys or floats, *d d d*, arranged contiguously on a lace-line, *f*, which passes through holes *e e*, centrally located in *d d*. After the floats are strung on the lace-line *f*, they are pressed hard against each other. The line *f* is drawn tight and both ends are made fast to the hanging-line. Further, that the series of floats may be more closely drawn together and more securely attached to the hanging-line C, at the interval between every third or fourth float, the lace-line and the hanging-line are joined by a seizing or other convenient fastening. *h h h* indicate the intervals of such fastenings.

On the front side of the sack is seen a "seine-line," *h*, so called because by its use a seine can be made fast to the sack when transferring the fish from the seine to the sack or pocket B. This seine-line is attached to the hanging-line C by means of seizings *g g*, located at a points a few inches removed from each other. Between the seizing-points *g g* stop-lines *n n* are attached to the hanging-line C.

At the corners of the sack or pocket are loops o o, into which are tied lines leading to large buoys or floats M M.

Projecting over the side of the vessel is a boom, of the description now much in use for mooring a boat.

Running through a block, s, at the end of the boom is a painter-line, p. This line is represented as hooking into one of the loops o.

The method of constructing the cylindrical parts D D and attaching the same to the hanging-line C is a very important feature of my newly-organized floating fish sack or pocket. As above set out, the parts D D are composed of a series of small floats, d d, arranged contiguously along a lace-line, f, and so closely placed as to practically make one long cylindrical float or boom. The small floats used for this purpose are the ordinary cork seine-floats, about two inches deep, with a diameter of about four and one-half inches. The object of constructing a long float or boom such as described from a combination of small floats is to produce a floating or buoying arrangement which shall in use operate to keep the sack afloat just as a solid float or boom would and at the same time shall be possessed of sufficient flexibility to bend and turn on the surface of the water as the same is undulated by the waves. The extreme lightness of the material employed and the flexibility of floats D D will make the operation of the whole device very easy.

When in the water the inner ends of the floats D D rest against the vessel's hull and, projecting outwardly at or near right angles, keep the mouth of the sack open and extended. The floats D D are in no way directly fastened to the vessel's side. Their only connection is such as is brought about by reason of being attached to the hanging-line C. If at any time there is a tendency of the floats D D to drift in against the vessel's side, the painter-line p can be hooked into one of the loops o and drawn inboard with sufficient tautness to keep the part D extended under the boat-boom P.

The sack or pocket B is made of very stout heavy netting material capable of sustaining great weight, so that when the sack is filled there shall be no danger of the fish bursting out and swimming off into the sea. Further, it is necessary to give great strength to the walls of the sack in order that all assaults from fish-eating fish can be successfully resisted.

The operation of the sack or pocket is as follows: As soon as a school of fish have been properly secured in a large seine they are brought alongside the fishing-vessel and the sack B is lowered over the side, the suspending-ropes a a being made fast to some point along the vessel's rail. The seine is next attached to the sack by taking any suitable number of the floats attached to the hanging-line of the seine and gathering them into a compact bundle. The bundle is then passed through one of the loops between the seine-line H and the hanging-line C. The stop-line n is then passed over the seine-line and tightly tied. This operation is repeated until all the loops across the front of the sack contain a bundle of seine-buoys. Thus the seine and sack are securely fastened together. The fish can then be easily transferred from the seine to the sack, in which they are retained until needed for packing and dressing. After the fish have all been transferred the stop-lines n n are unbound and the seine is taken away. In order that the weight of fish contained in the sack shall not sink it far below the surface of the water and permit the contained fish to escape, I intend, as fast as a stop is untied and a bundle of seine-floats is withdrawn from a seine-line loop, that a movable buoy or float shall be substituted in its place, so that when the seine is taken away there will be a series of buoys attached to the hanging-line C along the front of the sack, having sufficient buoyant capacity to keep the sack floating.

A floating fish sack or pocket constructed and operated as hereinbefore set forth presents many very decided improvements over any other device for similar use known to me. By its use all danger of killing or otherwise injuring the fish contained in the sack is obviated. The long flexible booms D D will always accommodate themselves to the undulation of the waves, and no matter how much the vessel may roll about the sack will only rise and fall with the surface of the water. If the sack were suspended from a solid boom rigidly attached to and projecting from the vessel's side, the sack would rise and fall with the vessel, and many fish would be killed and bruised by rubbing and striking against each other and the walls of the sack by reason of the constant "churning" up and down.

On account of the lightness and flexibility of the parts D D, the ease with which the sack can be put overboard and taken inboard is a very great advantage, as much time and labor are saved. Further, the extreme simplicity of construction makes the sack an inexpensive article in cost. Other advantages might be enumerated; but sufficient has been shown to prove the practicability and utility of the invention.

What I claim as my invention, and desire to secure by Letters Patent, is—

1. A floating fish sack or pocket provided with the flexible buoy or float D, consisting of a series of small floats, d d, arranged contiguously upon a lace, f, and seized to the hanging-line C at intervals, as shown, substantially as and for the purposes set forth.

2. A floating fish pocket or sack consisting of a box-shaped netted receptacle, B, suspended from the hanging-line C, the flexible buoys or floats D, made as described, centrally pierced by the lace-line f and securely fastened to said hanging-line C by means of the lace-line $f$ and seizings $h\ h$, the seine-line H, made secure to the hanging-line by seizings $g\ g$ and the stop-lines $n\ n$, for the purpose of binding a bundle
5 of seine-floats into the loops between said seine-line and said hanging-line, all constructed and arranged substantially as set forth.

In testimony that I claim the foregoing as my own I have affixed my signature in presence of two witnesses.

MICHAEL SAUNDERS SMALL.

Witnesses:
H. G. BRIGGS,
WM. H. MOTLEY.